US011619409B2

(12) United States Patent
Nakai et al.

(10) Patent No.: US 11,619,409 B2
(45) Date of Patent: Apr. 4, 2023

(54) CONTROL SYSTEM FOR A HEATING, VENTILATION, AND AIR-CONDITIONING SYSTEM

(71) Applicants: Goodman Global Group, Inc., Waller, TX (US); Daikin Industries, Ltd., Osaka (JP)

(72) Inventors: Akinori Nakai, Waller, TX (US); Takahiro Yamada, Waller, TX (US); Cheng Li, Waller, TX (US); Hideyuki Nakagawa, Osaka (JP); Shinichi Takahashi, Osaka (JP)

(73) Assignees: Goodman Global Group, Inc., Waller, TX (US); Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/186,237

(22) Filed: Feb. 26, 2021

(65) Prior Publication Data

US 2022/0275957 A1 Sep. 1, 2022

(51) Int. Cl.
*F24F 11/30* (2018.01)
*F24F 11/74* (2018.01)
(Continued)

(52) U.S. Cl.
CPC .............. *F24F 11/30* (2018.01); *F24F 11/56* (2018.01); *F24F 11/64* (2018.01); *F24F 11/65* (2018.01);
(Continued)

(58) Field of Classification Search
CPC ........ F24F 11/0001; F24F 3/044; F24F 11/30; F24F 11/74; F24F 3/0442; F24F 11/77;
(Continued)

(56) References Cited

U.S. PATENT DOCUMENTS

2003/0194965 A1* 10/2003 Paschke .............. F24F 13/0218
454/306
2005/0156050 A1* 7/2005 Shah ..................... F24F 3/0442
165/205
(Continued)

FOREIGN PATENT DOCUMENTS

| CN | 104110794 A | * 10/2014 |
| JP | 2017161090 A | 9/2017 |
| KR | 101256780 B1 | 4/2013 |

OTHER PUBLICATIONS

International Search Report and Written Opinion dated May 24, 2022 for corresponding PCT Application No. PCT/US2022/015067 filed Feb. 3, 2022.

*Primary Examiner* — Alicia M. Choi
(74) *Attorney, Agent, or Firm* — K&L Gates LLP

(57) ABSTRACT

A control system for a HVAC system for a structure and including a blower that flows air over an indoor heat exchanger. The control system may include a first input device, a first sensor, and a processor in electronic communication with the first input device, the first sensor, and the blower of the HVAC system. The first input device may be operable to accept a zoning mode selection. The first sensor may be sensor operable to measure a first temperature at a first location within the structure. The processor may be programmed to determine a cooling or heating demand on the HVAC system based on an input temperature and the first measured temperature. The processor may be further programmed to adjust an air flow rate produced by the blower based on the demand on the HVAC system and the zoning mode selection.

17 Claims, 4 Drawing Sheets

(51) Int. Cl.
| | |
|---|---|
| *F24F 11/80* | (2018.01) |
| *F24F 11/64* | (2018.01) |
| *F24F 11/65* | (2018.01) |
| *F24F 11/79* | (2018.01) |
| *F24F 13/02* | (2006.01) |
| *F24F 13/10* | (2006.01) |
| *F24F 11/77* | (2018.01) |
| *G05B 19/042* | (2006.01) |
| *F24F 11/56* | (2018.01) |
| *F24F 110/10* | (2018.01) |
| *F24F 140/40* | (2018.01) |
| *F24F 140/50* | (2018.01) |
| *F24F 140/60* | (2018.01) |
| *F24F 140/00* | (2018.01) |

(52) U.S. Cl.
CPC .............. *F24F 11/74* (2018.01); *F24F 11/77* (2018.01); *F24F 11/79* (2018.01); *F24F 11/80* (2018.01); *F24F 13/02* (2013.01); *F24F 13/10* (2013.01); *G05B 19/042* (2013.01); *F24F 2110/10* (2018.01); *F24F 2140/00* (2018.01); *F24F 2140/40* (2018.01); *F24F 2140/50* (2018.01); *F24F 2140/60* (2018.01); *G05B 2219/2614* (2013.01)

(58) Field of Classification Search
CPC .. F24F 11/80; F24F 11/64; F24F 11/65; F24F 11/56; F24F 11/79; F24F 13/02; F24F 13/10; F24F 2140/40; F24F 2140/60; F24F 2140/00; F24F 2140/50; F24F 2110/10; G05B 19/042; G05B 2219/2614
See application file for complete search history.

(56) References Cited

U.S. PATENT DOCUMENTS

| | | | |
|---|---|---|---|
| 2010/0070085 A1* | 3/2010 | Harrod | F24F 11/30 700/282 |
| 2012/0239208 A1 | 9/2012 | Federspiel et al. | |
| 2014/0203089 A1* | 7/2014 | Hrejsa | F24F 11/74 454/338 |
| 2015/0276250 A1 | 10/2015 | Lintern | |
| 2019/0195528 A1 | 6/2019 | Puranen | |
| 2019/0353367 A1* | 11/2019 | Atchison | F24F 11/30 |
| 2019/0353388 A1 | 11/2019 | Burns et al. | |
| 2020/0393144 A1 | 12/2020 | Pulice | |
| 2021/0293435 A1* | 9/2021 | Atchison | G05B 15/02 |
| 2022/0120468 A1* | 4/2022 | Burks, III | F24F 11/74 |

\* cited by examiner

CONTROL SYSTEM FOR A HEATING, VENTILATION, AND AIR-CONDITIONING SYSTEM

BACKGROUND

This section is intended to provide relevant background information to facilitate a better understanding of the various aspects of the described embodiments. Accordingly, these statements are to be read in this light and not as admissions of prior art.

In general, heating, ventilation, and air-conditioning ("HVAC") systems circulate an indoor space's air over low-temperature (for cooling) or high-temperature (for heating) sources, thereby adjusting an indoor space's ambient air temperature. HVAC systems generate these low- and high-temperature sources by, among other techniques, taking advantage of a well-known physical principle: a fluid transitioning from gas to liquid releases heat, while a fluid transitioning from liquid to gas absorbs heat.

Within a typical variable capacity HVAC system, a fluid refrigerant circulates through a closed loop of tubing that uses a compressor, which receives DC power from an inverter, and flow-control devices to manipulate the refrigerant's flow and pressure, causing the refrigerant to cycle between the liquid and gas phases. Generally, these phase transitions occur within the HVAC system heat exchangers, which are part of the closed loop and designed to transfer heat between the circulating refrigerant and flowing ambient air. As would be expected, the heat exchanger providing heating or cooling to the climate-controlled space or structure is described adjectivally as being "indoors," and the heat exchanger transferring heat with the surrounding outdoor environment is described as being "outdoors."

The refrigerant circulating between the indoor and outdoor heat exchangers, transitioning between phases along the way, absorbs heat from one location and releases it to the other. Those in the HVAC industry describe this cycle of absorbing and releasing heat as "pumping." To cool the climate-controlled indoor space, heat is "pumped" from the indoor side to the outdoor side, and the indoor space is heated by doing the opposite, pumping heat from the outdoors to the indoors.

Additionally, some HVAC systems include dampers installed within supply ducting, as well as a bypass duct with a bypass damper. The bypass duct relieves excess static pressure created when one or more supply duct dampers are closed during heating or cooling by flowing a portion of the airflow from the blower into a return duct. However, the bypass duct and bypass damper increases the initial cost of the HVAC system and increases the time required to install the HVAC system.

BRIEF DESCRIPTION OF THE DRAWINGS

Embodiments of the HVAC system are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes an HVAC system having a zoning mode selection. Enabling zoning mode in the control system for the HVAC system allows the HVAC control system operate a blower, which flows air into climate-controlled spaces via ducts, across a broad range of air flow rates to meet low cooling or heating demands on the HVAC system without the use of a bypass duct and bypass damper. This is accomplished by reducing the air flow rate produced by the blower below what is typically the minimum air flow rate produced by a blower.

Figure 1:
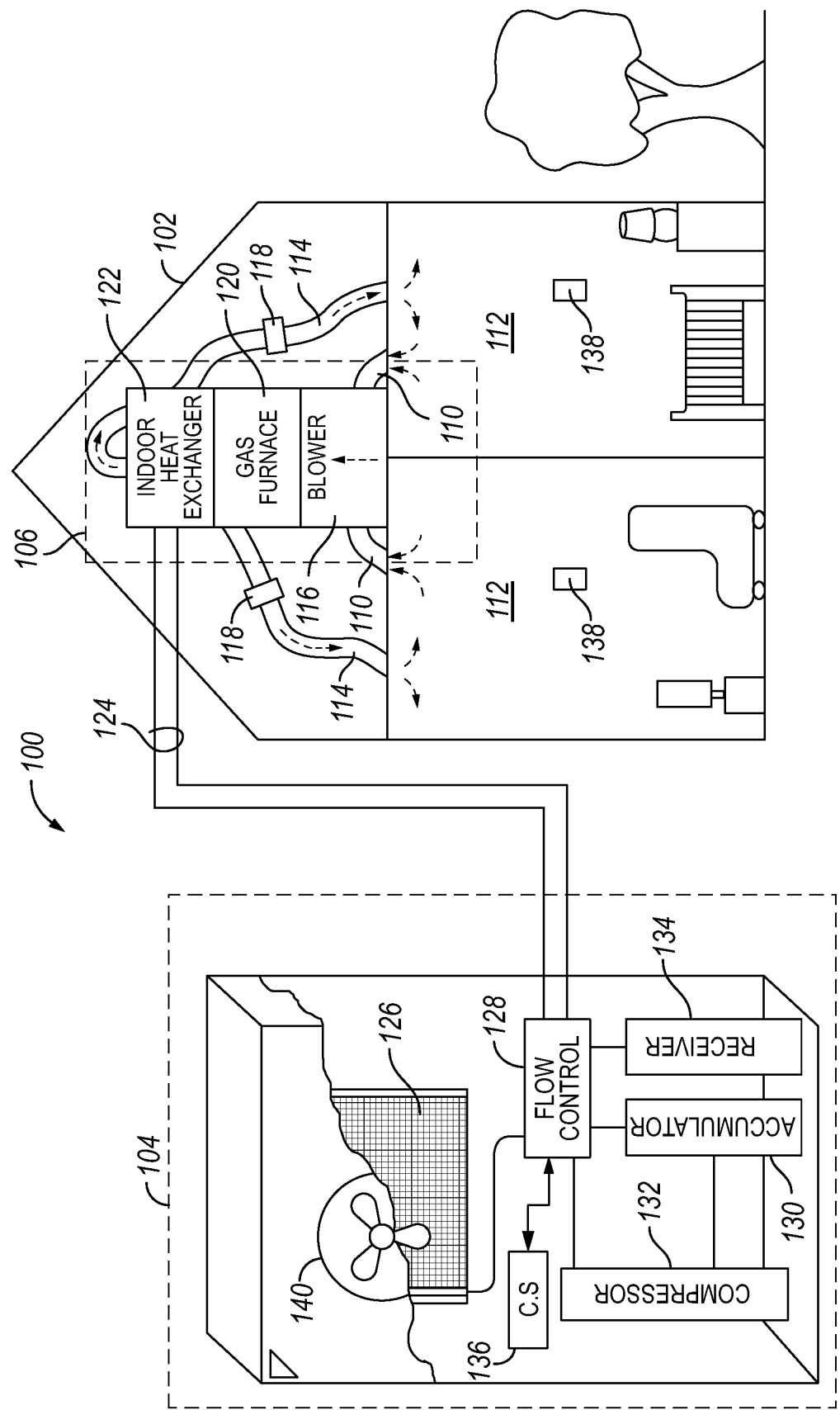
FIG. 1 is a schematic of an HVAC system, according to one or more embodiments.

Turning now to the figures, FIG. 1 shows an HVAC system 100 that provides heating and cooling for a residential structure 102. However, the concepts disclosed herein are applicable to numerous of heating and cooling situations, which include residential, industrial, and commercial settings.

The described HVAC system 100 is divided into two primary portions: (1) the outdoor unit 104, which mainly comprises components for transferring heat with the environment outside the structure 102; and (2) the indoor unit 106, which mainly comprises components for transferring heat with the air inside the structure 102. To heat or cool the illustrated structure 102, the indoor unit 106 draws ambient indoor air via return ducts 110, passes that air over one or more heating/cooling elements (i.e., sources of heating or cooling), and then routes that conditioned air, whether heated or cooled, back to the various climate-controlled spaces 112 through the supply ducts or ductworks 114—which are relatively large conduits that may be rigid or flexible. A blower 116 provides the motivational force to circulate the ambient air through the return ducts 110 and the supply ducts 114. The supply ducts 114 may also include dampers 118 to control the flow of conditioned air into specific areas of the structure 102. Additionally, although a split system is shown in FIG. 1, the disclosed embodiments can be equally applied to the packaged or other types of the HVAC system configurations.

As shown, the HVAC system 100 is a "dual-fuel" system that has multiple heating elements, such as an electric heating element or a gas furnace 120. The gas furnace 120 located downstream (in relation to airflow) of the blower 116 combusts natural gas to produce heat in furnace tubes (not shown) that coil through the gas furnace 120. These furnace tubes act as a heating element for the ambient indoor air being pushed out of the blower 116, over the furnace tubes, and into the supply ducts 114. However, the gas furnace 120 is generally operated when robust heating is desired. During conventional heating and cooling operations, air from the blower 116 is routed over an indoor heat exchanger 122 and into the supply ducts 114. The blower 116, the gas furnace 120, and the indoor heat exchanger 122 may be packaged as an integrated air handler unit, or those components may be modular. In other embodiments, the positions of the gas furnace 120, the indoor heat exchanger 122, and the blower 116 can be reversed or rearranged.

The indoor heat exchanger 122 acts as a heating or cooling means that adds or removes heat from the structure, respectively, by manipulating the pressure and flow of refrigerant circulating within and between the indoor and outdoor units via refrigerant lines 124. Alternatively, the refrigerant could be circulated to only cool (i.e., extract heat from) the structure, with heating provided independently by another source, such as, but not limited to, the gas furnace 120. There may also be no heating of any kind. HVAC systems 100 that use refrigerant to both heat and cool the structure 102 are often described as heat pumps, while HVAC systems 100 that use refrigerant only for cooling are commonly described as air conditioners.

Whatever the state of the indoor heat exchanger 122 (i.e., absorbing or releasing heat), the outdoor heat exchanger 126 is in the opposite state. More specifically, if heating is desired, the illustrated indoor heat exchanger 122 acts as a condenser, aiding transition of the refrigerant from a high-pressure gas to a high-pressure liquid and releasing heat in the process. The outdoor heat exchanger 126 acts as an evaporator, aiding transition of the refrigerant from a low-pressure liquid to a low-pressure gas, thereby absorbing heat from the outdoor environment. If cooling is desired, the outdoor unit 104 has flow control devices 128 that reverse the flow of the refrigerant, allowing the outdoor heat exchanger 126 to act as a condenser and allowing the indoor heat exchanger 122 to act as an evaporator.

The flow control devices 128 may also act as an expansion device to reduce the pressure of the refrigerant flowing therethrough. In other embodiments, the expansion device may be a separate device located in either the outdoor unit 104 or the indoor unit 106. To facilitate the exchange of heat between the ambient indoor air and the outdoor environment in the described HVAC system 100, the respective heat exchangers 122, 126 have tubing that winds or coils through heat-exchange surfaces, to increase the surface area of contact between the tubing and the surrounding air or environment.

The illustrated outdoor unit 104 may also include an accumulator 130 that helps prevent liquid refrigerant from reaching the inlet of a compressor 132. The outdoor unit 104 may include a receiver 134 that helps to maintain sufficient refrigerant charge distribution in the HVAC system 100. The size of these components is often defined by the amount of refrigerant employed by the HVAC system 100.

The compressor 132 receives low-pressure gas refrigerant from either the indoor heat exchanger 122 if cooling is desired or from the outdoor heat exchanger 126 if heating is desired. The compressor 132 then compresses the gas refrigerant to a higher pressure based on a compressor volume ratio, namely the ratio of a discharge volume, the volume of gas outputted from the compressor 132 once compressed, to a suction volume, the volume of gas inputted into the compressor 132 before compression. In the illustrated embodiment, the compressor is a multi-stage compressor 132 that can transition between at least two volume ratios depending on whether heating or cooling is desired. In other embodiments, the HVAC system 100 may be configured to only cool or only heat, and the compressor 132 may be a single-stage compressor having only a single volume ratio.

A control system 136 controls the blower 116, based on the required heating or cooling that must be provided by the HVAC system, i.e., the demand on the HVAC system 100, as well as settings input by a user via an input device, such as, but not limited to, a thermostat 138 or a control panel of the HVAC system 100, and/or the operational status of the HVAC system 100. Although the control system is shown as a single component of the outdoor unit 104, the invention is not thereby limited. In another embodiment, the control system 136 may be located within the climate-controlled area 112. In other embodiments, the control system 136 may be made up of multiple control systems or controllers, as described below with reference to FIG. 4, positioned at various points within the HVAC system and/or climate-controlled area 112 that are in electronic communication with each other.

In some embodiments, the control system 136 may also adjust the position of the dampers 118, the air flow rate produced by a fan 140 that blows air across the outdoor heat exchanger 126, and the speed of the compressor 132. The control system 136 may further control the switching between compressor stages for multi-stage compressors. Although the thermostats 138 are shown as a separate from the indoor unit 106, other embodiments, such as, but not limited to packaged HVAC systems, may include a thermostat 138 that is integrated into the indoor unit 106. Additionally, other embodiments may include more than two thermostats 138.

The control system 136 determines the cooling or heating demand on the HVAC system 100 based on the user input, such as a desired temperature, desired temperature range, or a desired humidity, the positions of the dampers 118, and/or data from sensors within the thermostats 138 or sensors placed within the structure 102 and/or throughout the HVAC system 100. The data measured by the sensors may include, but is not limited to, the temperature within the climate-controlled area 112, the humidity within the climate-controlled area 112, the temperature outside of the structure 102, the humidity outside of the structure 102, and refrigerant pressure within the HVAC system. The HVAC system 100 may include any number of sensors 142 and input devices, each of which can accept a user input.

Figure 2:
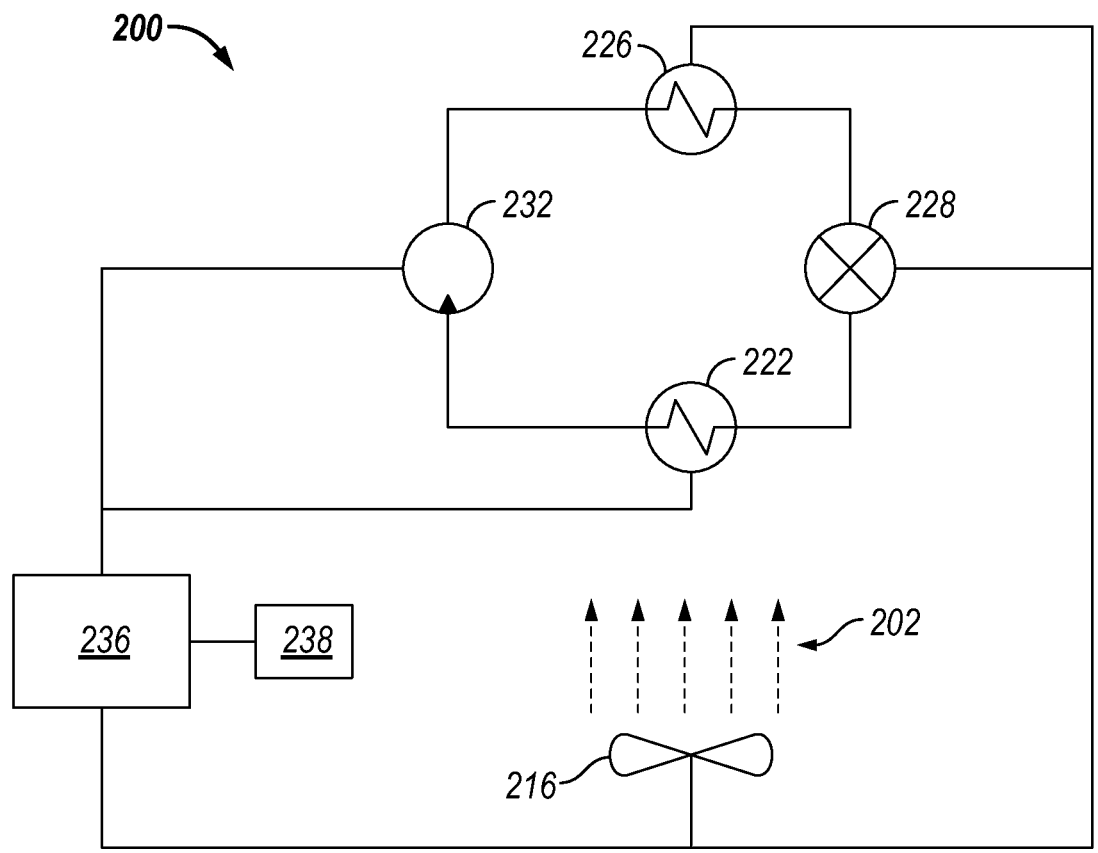
FIG. 2 is a simplified block diagram of an HVAC system 200, according to one or more embodiments.

Referring now to FIG. 2, FIG. 2 shows a block diagram of an HVAC system 200. The HVAC system 200 includes an outdoor heat exchanger 226, an expansion device 228, an indoor heat exchanger 222, and a compressor 232. Additionally, the heat exchangers 222, 226 may be either condensers or evaporators, depending on the configuration of the HVAC system 200. The HVAC system 200 may also include the equipment shown in FIG. 1 and function as discussed above with reference to FIG. 1. Accordingly, the function of the outdoor heat exchanger 226, the expansion device 228, the indoor heat exchanger 222, and the compressor 232 will not be discussed in detail except as necessary for the understanding of the HVAC system 200 shown in FIG. 2.

When cooling is desired, high-pressure refrigerant flows from the compressor 232 to the outdoor heat exchanger 226, where it is condensed. The high-pressure liquid refrigerant then flows to the expansion device 228, where it is expanded to low-pressure refrigerant. The low-pressure refrigerant is then evaporated in the indoor heat exchanger 222 and the low-pressure vapor flows into the compressor 232 as a vapor, to begin the cycle again. When the HVAC system 200 is operating as a heat pump, the flow of refrigerant is reversed. A blower 216 flows air 202 over the indoor heat exchanger 222 to provide a climate-controlled space with conditioned air.

As shown in FIG. 2, the HVAC system 200 includes a control system 236 in electronic communication with the blower 216 and an input device 238. The input device 238 is configured to allow a user to select if zoning mode is enabled or disabled. When zoning mode is disabled, the control system 236 operates the blower 216 within a first air flow rate range, e.g., between 70% and 100% of the rated cubic feet per minute ("CFM") of the blower 216, depending on the demand on the HVAC system 200. However, this may still produce more airflow than is necessary to meet the demand on the HVAC system 200. When zoning mode is enabled, the control system 236 operates the blower within a second air flow rate range that allows for a lower air flow rate than the first range, e.g., between 40% and 100% of the rated CFM of the blower 216. The lower minimum air flow rate of the second range allows the blower 216 to move a reduced amount of air through the indoor heat exchanger when there is less demand on the HVAC system, thereby more efficiently addressing the demand on the HVAC system by running the blower at a lower air flow rate instead of utilizing a bypass duct to flow air into a return duct.

The input device may also allow the user to select fixed offset for the blower 216. When a fixed offset is entered to reduce the air flow rate produced by the blower 216, the control system may reduce the percentages of the first air flow rate range by a fixed amount or percentage, e.g., with a 15% offset entered for the first air flow rate range above, the control system 236 would operate the blower 216 between 55% and 85% of the rated CFM. Similarly, when a fixed offset is entered to increase the air flow rate produced by the blower 216, the control system may increase the lower amount or percentage of the first air flow rate range by a fixed amount or percentage, e.g., with a 15% offset entered for the first air flow rate range above, the control system 236 would operate the blower 216 between 85% and 100% of the rated CFM The control system 236 is also in electronic communication with the compressor 232, the outdoor heat exchanger 226, the expansion device 228, and the indoor heat exchanger 222. The control system 236 receives information from sensors on one or more of these components of the HVAC system 200 to determine if protection controls, such as, but not limited to, defrost control and oil recovery control, need to be implemented. When protection controls are implemented by the control system 236, the zone control selection is overridden and the blower is operated according to the requirements of the specific protection control, which typically falls within the first air flow rate range. The control system 236 may also monitor the HVAC system 200 to determine if the HVAC system 200 is performing startup operations. Similar to when protection controls are implemented, the zone control selection is overridden and the blower is operated according to the requirements of the startup operations, which typically falls within the first air flow rate range.

Figure 3:
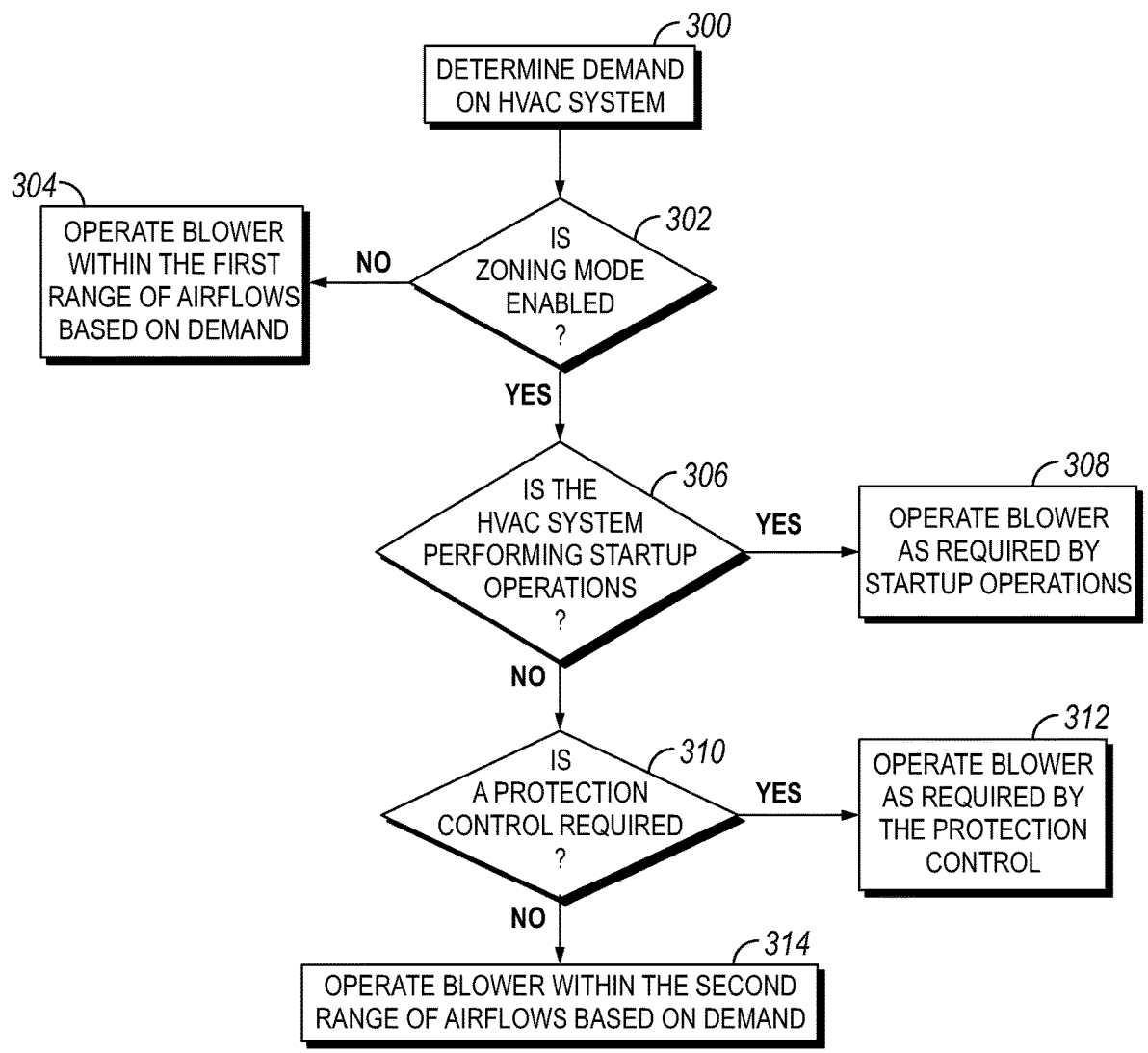
FIG. 3 is a flowchart of a method of operating an HVAC system, according to one or more embodiments.

FIG. 3 is a flowchart of method of operating an HVAC system. The method may be performed by a control system, such as the control systems 136, 236 discussed above. The illustrated method allows the control system to operate a blower across a larger air flow rate range to better meet lesser cooling or heating demands on the HVAC system.

In step 300, the control system determines the demand on the HVAC system. As discussed above, the demand on the HVAC system is based on user inputs, such as a desired temperature, desired temperature range, and/or a desired humidity, and/or data from the thermostat or sensors placed throughout the HVAC system. The data measured by the sensors may include, but is not limited to, the temperature within a climate-controlled area, the humidity within the climate-controlled area 112, the temperature outside of the structure 102, the humidity outside of the structure 102, and refrigerant pressure within the HVAC system.

In step 302, the control system determines if zoning mode is enabled based on a user input. If zoning mode is disabled, the control system operates the blower within the first air flow rate range based on the demand on the HVAC system, as shown in step 304. The control system may also operate the blower within the first range based on other considerations, such as protection controls and startup operations.

If zoning mode is enabled, the control system then determines if the HVAC system is performing startup operations, as shown in step 306. If the HVAC system is performing startup operations, the control system operates the blower according to the requirements of the startup operations, as shown in step 308.

If the HVAC system is not performing startup operations, the control system then determines if a protection control are required, as shown in step 310. The control system determines if the protection control is required based on measurements from sensors placed throughout the components of the HVAC system. If a protection control is required, the control system operates the blower according to the requirements of the protection control, as shown in step 312. If protection controls are not required, the control system operates the blower within the second air flow rate range based on the demand on the HVAC system, as shown in step 314.

Figure 4:
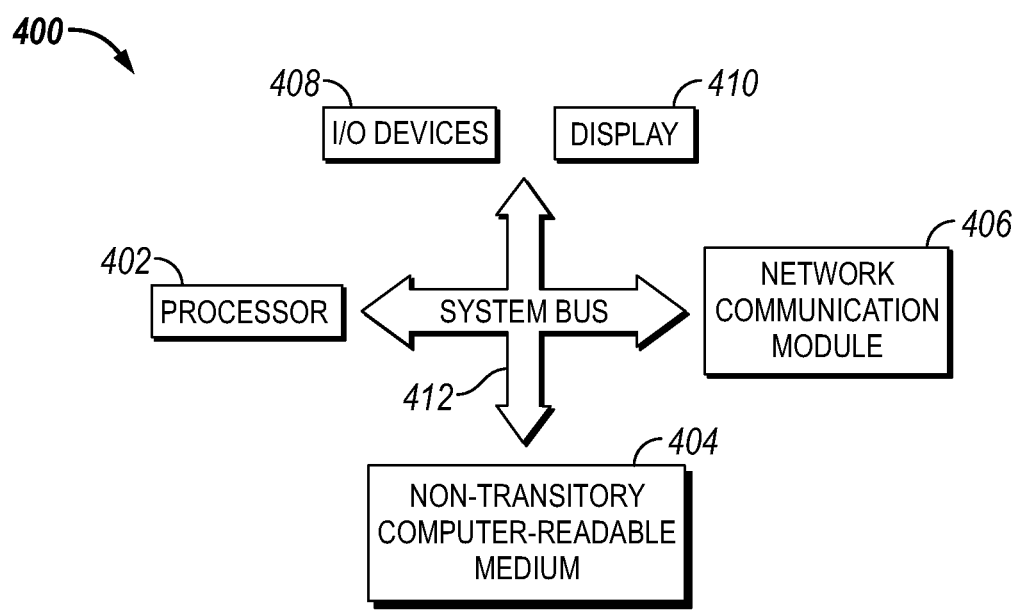
FIG. 4 is a block diagram of a controller, according to one or more embodiments.

FIG. 4 is a block diagram of a controller 400 that can be used to control the blower of an HVAC system, such as in the control systems 136, 236 described above. The controller 400 includes at least one processor 402, a non-transitory computer readable medium 404, an optional network communication module 406, optional input/output devices 408, and an optional display 410 all interconnected via a system bus 412. In at least one embodiment, the input/output device 408 and the display 410 may be combined into a single device, such as a touch-screen display. Further, the display 410 may also include a temperature sensor that monitors the temperature within the climate-controlled area. Software instructions executable by the processor 402 for implementing software instructions stored within the controller 400 in accordance with the illustrative embodiments described herein, may be stored in the non-transitory computer readable medium 404 or some other non-transitory computer-readable medium.

Although not explicitly shown in FIG. 4, it will be recognized that the controller 400 may be connected to one or more public and/or private networks via appropriate network connections. It will also be recognized that software instructions may also be loaded into the non-transitory computer readable medium 404 from an appropriate storage media or via wired or wireless means.

Further examples include:

Example 1 is a control system for a HVAC system for a structure and comprising a blower that flows air over an indoor heat exchanger. The control system includes a first input device, a first sensor, and a processor in electronic communication with the first input device, the first sensor, and the blower of the HVAC system. The first input device is operable to accept a zoning mode selection. The first sensor is sensor operable to measure a first temperature at a first location within the structure. The processor is programmed to determine a cooling or heating demand on the HVAC system based on an input temperature and the first measured temperature. The processor is further programmed to adjust an air flow rate produced by the blower based on the demand on the HVAC system and the zoning mode selection.

In Example 2, the embodiments of any preceding paragraph or combination thereof further include wherein the first input device is further operable to accept the input temperature.

In Example 3, the embodiments of any preceding paragraph or combination thereof further include a second input device and a second sensor operable to measure a second temperature at a second location within the structure. The first and second input devices are both operable to accept the input temperature and the zoning mode selection. The processor is further programmed to also determine the demand on the HVAC system based on the second measured temperature.

In Example 4, the embodiments of any preceding paragraph or combination thereof further include wherein when zoning mode is disabled, the control system is operable to operate the blower within a first air flow rate range having a first minimum air flow rate. When zoning mode is enabled, the control system is operable to operate the blower within a second air flow rate range having a second minimum air flow rate that is lower than the first minimum air flow rate.

Example 5 is an HVAC system for a structure having ductwork. The HVAC system includes a refrigeration circuit comprising a compressor, an outdoor heat exchanger, an expansion device, and an indoor heat exchanger. The HVAC system also includes a blower that flows air over the indoor heat exchanger and through the ductwork. The HVAC system further includes a control system including a first input device, a first sensor, and a processor in electronic communication with the first input device, the first sensor, and the blower of the HVAC system. The first input device is operable to accept a zoning mode selection. The first sensor is sensor operable to measure a first temperature at a first location within the structure. The processor is programmed to determine a cooling or heating demand on the HVAC system based on an input temperature and the first measured temperature. The processor is further programmed to adjust an air flow rate produced by the blower based on the demand on the HVAC system and the zoning mode selection.

In Example 6, the embodiments of any preceding paragraph or combination thereof further include wherein the first input device is further operable to accept the input temperature.

In Example 7, the embodiments of any preceding paragraph or combination thereof further include wherein the control system further includes a second input device and a second sensor. The second input device is operable to accept at least one of the input temperature or the zoning mode selection. The second sensor is operable to measure a second temperature at a second location within the structure. Determining the demand on the HVAC system includes determining the demand on the HVAC system based on the input temperature, the first measured temperature, and the second measured temperature.

In Example 8, the embodiments of any preceding paragraph or combination thereof further include dampers installable within the ductwork. The processor is in electronic communication with the dampers. The processor is further programmed to adjust a position of one or more of the dampers.

In Example 9, the embodiments of any preceding paragraph or combination thereof further include wherein the processor is further programmed to adjust the air flow rate produced by the blower based also on the position of the dampers.

In Example 10, the embodiments of any preceding paragraph or combination thereof further include wherein the ductwork does not include a bypass duct and the HVAC system does not include a bypass damper installable within the bypass duct.

In Example 11, the embodiments of any preceding paragraph or combination thereof further include sensors operable to monitor a status of at least one of the compressor, the indoor heat exchanger, the outdoor heat exchanger, or the expansion device and communicate information on the status with the control system. The processor is further programmed to adjust the air flow rate produced by the blower based also on the information from the sensors.

In Example 12, the embodiments of any preceding paragraph or combination thereof further include wherein the processor is further programed to determine if a startup operation is occurring and adjust the air flow rate produced by the blower based also on the startup operation determination.

In Example 13, the embodiments of any preceding paragraph or combination thereof further include wherein when zoning mode is disabled, the control system is operable to operate the blower within a first air flow rate range having a first minimum air flow rate. When zoning mode is enabled, the control system is operable to operate the blower within a second air flow rate range having a second minimum air flow rate that is lower than the first minimum air flow rate.

Example 14 is a method of operating an HVAC system. The method includes identifying a zoning mode selection and an input temperature. The method also includes measuring a first temperature at a first location within a structure. The method further includes determining a demand on the HVAC system based on the input temperature and the first measured temperature. The method also includes adjusting air flow rate produced by a blower of the HVAC system based on the demand on the HVAC system and the zoning mode selection.

In Example 15, the embodiments of any preceding paragraph or combination thereof further include measuring a second temperature at a second location within the structure, wherein determining the demand on the HVAC system further comprises also determining the demand on the HVAC system based on the second measured temperature.

In Example 16, the embodiments of any preceding paragraph or combination thereof further include adjusting a position of one or more dampers installed in ductwork of the structure, wherein adjusting the air flow rate produced by the blower comprises adjusting the air flow rate produced by the blower based on the demand on the HVAC system, the zoning mode selection, and the position of the dampers.

In Example 17, the embodiments of any preceding paragraph or combination thereof further include wherein the ductwork does not include a bypass duct and the one or more dampers does not include a bypass damper installed within the bypass duct.

In Example 18, the embodiments of any preceding paragraph or combination thereof further include monitoring a status of at least one of a compressor of the HVAC system, an indoor heat exchanger of the HVAC system, an outdoor heat exchanger of the HVAC system, or an expansion device of the HVAC system via sensors, wherein adjusting the air flow rate produced by the blower comprises adjusting the air flow rate produced by the blower based on the demand on the HVAC system, the zoning mode selection, and information from the sensors.

In Example 19, the embodiments of any preceding paragraph or combination thereof further include determining if a startup operation is in occurring, wherein adjusting the air flow rate produced by the blower comprises adjusting the air flow rate produced by the blower based on the demand on the HVAC system, the zoning mode selection, and the startup operation determination.

In Example 20, the embodiments of any preceding paragraph or combination thereof further include when zoning mode is disabled, the control system is operable to operate the blower within a first air flow rate range having a first minimum air flow rate. When zoning mode is enabled, the control system is operable to operate the blower within a second air flow rate range having a second minimum air flow rate that is lower than the first minimum air flow rate.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed. Similarly, the term electronic communication may include wired or wireless communication either directly between components and/or systems or through one or more intermediate components and/or systems.

In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A control system for a heating, ventilation, and air-conditioning ("HVAC") system for a structure and comprising a blower that flows air over an indoor heat exchanger, the control system comprising:
    a first input device operable to accept a zoning mode selection;
    a first sensor operable to measure a first temperature at a first location within the structure; and
    a processor in electronic communication with the first input device, the first sensor, and the blower of the HVAC system, the processor programmed to:
    determine a cooling or heating demand on the HVAC system based on an input temperature and the first measured temperature; and
    adjust an air flow rate produced by the blower based on the demand on the HVAC system and the zoning mode selection,
    wherein when zoning mode is disabled, the control system is operable to operate the blower within a first air flow rate range between a first minimum air flow rate and a first maximum air flow rate;
    when the zoning mode is enabled, the control system is operable to operate the blower within a second air flow rate range between a second minimum air flow rate and a second maximum air flow rate, wherein the second minimum air flow rate is lower than the first minimum air flow rate; and
    wherein the enablement of the zoning mode in the control system allows the blower to operate within a broader range of air flow rates compared to the zoning mode disabled to meet low cooling or heating demands without a use of a bypass duct configured to relieve excess static pressure and without a bypass damper.

2. The control system of claim 1, wherein the first input device is further operable to accept the input temperature.

3. The control system of claim 1, further comprising:
    a second input device, wherein the first and second input devices are both operable to accept the input temperature and the zoning mode selection;
    a second sensor operable to measure a second temperature at a second location within the structure; and
    wherein the processor is further programmed to also determine the demand on the HVAC system based on the second measured temperature.

4. An HVAC system for a structure having ductwork, the HVAC system comprising:
    a refrigeration circuit comprising a compressor, an outdoor heat exchanger, an expansion device, and an indoor heat exchanger;

a blower that flows air over the indoor heat exchanger and through the ductwork; and a control system comprising: a first input device operable to accept a zoning mode selection;

a first sensor operable to measure a first temperature at a first location within the structure; and a processor in electronic communication with the first input device, the first sensor, and the blower of the HVAC system, the processor programmed to:

determine a demand on the HVAC system based on an input temperature and the first measured temperature; and adjust an air flow rate produced by the blower based on the demand on the HVAC system and the zoning mode selection, wherein when zoning mode is disabled, the control system is operable to operate the blower within a first air flow rate range between a first minimum air flow rate and a first maximum air flow rate;

when the zoning mode is enabled, the control system is operable to operate the blower within a second air flow rate range between a second minimum air flow rate and a second maximum air flow rate, wherein the second minimum air flow rate is lower than the first minimum air flow rate; and wherein the enablement of the zoning mode in the control system allows the blower to operate within a broader range of air flow rates compared to the non-zoning mode disabled to meet low cooling or heating demands without a use of a bypass duct configured to relieve excess static pressure and without a bypass damper.

5. The HVAC system of claim 4, wherein the first input device is further operable to accept the input temperature.

6. The HVAC system of claim 4, wherein the control system further comprises:

a second input device operable to accept at least one of the input temperature or the zoning mode selection;

a second sensor operable to measure a second temperature at a second location within the structure; and wherein determining the demand on the HVAC system comprises determining the demand on the HVAC system based on the input temperature, the first measured temperature, and the second measured temperature.

7. The HVAC system of claim 4, further comprising dampers installable within the ductwork, wherein:

the processor is in electronic communication with the dampers; and the processor is further programmed to adjust a position of one or more of the dampers.

8. The HVAC system of claim 7, wherein the processor is further programmed to adjust the air flow rate produced by the blower based also on the position of the dampers.

9. The HVAC system of claim 4, wherein the ductwork does not include a bypass duct and the HVAC system does not include a bypass damper installable within the bypass duct.

10. The HVAC system of claim 4, further comprising:

sensors operable to monitor a status of at least one of the compressor, the indoor heat exchanger, the outdoor heat exchanger, or the expansion device and communicate information on the status with the control system; and wherein the processor is further programmed to adjust the air flow rate produced by the blower based also on the information from the sensors.

11. The HVAC system of claim 4, wherein the processor is further programed to determine if a startup operation is occurring and adjust the air flow rate produced by the blower based also on the startup operation determination.

12. A method of operating an HVAC system, the method comprising:

identifying a zoning mode selection and an input temperature; measuring a first temperature at a first location within a structure;

determining a demand on the HVAC system based on the input temperature and the first measured temperature; and adjusting air flow rate produced by a blower of the HVAC system based on the demand on the HVAC system and the zoning mode selection, wherein when zoning mode is disabled, the blower operates within a first air flow rate range between a first minimum air flow rate and a first maximum air flow rate;

when the zoning mode is enabled, the blower operates within a second air flow rate range between a second minimum air flow rate and a second maximum air flow rate, wherein the second minimum air flow rate is lower than the first minimum air flow rate; and wherein adjusting air flow rate produced by a blower of the HVAC system based on the demand on the HVAC system and the zoning mode selection comprises operating the blower with the zoning mode enabled within a broader range of air flow rates compared to the zoning mode disabled to meet low cooling or heating demands without a use of a bypass duct configured to relieve excess static pressure and without a bypass damper.

13. The method of claim 12, further comprising measuring a second temperature at a second location within the structure, wherein determining the demand on the HVAC system further comprises also determining the demand on the HVAC system based on the second measured temperature.

14. The method of claim 13, further comprising adjusting a position of one or more dampers installed in ductwork of the structure, wherein adjusting the air flow rate produced by the blower comprises adjusting the air flow rate produced by the blower based on the demand on the HVAC system, the zoning mode selection, and the position of the dampers.

15. The method of claim 14, wherein the ductwork does not include a bypass duct and the one or more dampers does not include a bypass damper installed within the bypass duct.

16. The method of claim 12, further comprising monitoring a status of at least one of a compressor of the HVAC system, an indoor heat exchanger of the HVAC system, an outdoor heat exchanger of the HVAC system, or an expansion device of the HVAC system via sensors, wherein adjusting the air flow rate produced by the blower comprises adjusting the air flow rate produced by the blower based on the demand on the HVAC system, the zoning mode selection, and information from the sensors.

17. The method of claim 12, further comprising determining if a startup operation is occurring, wherein adjusting the air flow rate produced by the blower comprises adjusting the air flow rate produced by the blower based on the demand on the HVAC system, the zoning mode selection, and the startup operation determination.

* * * * *